United States Patent
Dodd et al.

(10) Patent No.: US 7,192,032 B2
(45) Date of Patent: *Mar. 20, 2007

(54) ELECTRONIC CONTROL OF VEHICLE AIR SUSPENSION

(75) Inventors: C Ian Dodd, Santa Margarita, CA (US); Hasmukh R. Shah, Andover, MA (US)

(73) Assignee: Barksdale, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/123,728

(22) Filed: May 6, 2005

(65) Prior Publication Data

US 2005/0200089 A1 Sep. 15, 2005

Related U.S. Application Data

(63) Continuation of application No. 10/355,900, filed on Jan. 31, 2003, now Pat. No. 6,918,600.

(60) Provisional application No. 60/375,464, filed on Apr. 23, 2002.

(51) Int. Cl.
*B60G 17/00* (2006.01)
(52) U.S. Cl. .............................. 280/5.508; 280/5.506; 280/124.16
(58) Field of Classification Search ............ 280/5.506, 280/5.508, 5.5, 5.502, 5.514, 124.128, 124.153, 280/124.16, 124.161
See application file for complete search history.

(56) References Cited

U.S. PATENT DOCUMENTS

| | | | |
|---|---|---|---|
| 4,733,876 A | * | 3/1988 | Heider et al. ............ 280/6.158 |
| 4,817,922 A | * | 4/1989 | Hovance .................... 267/64.21 |
| 4,923,210 A | * | 5/1990 | Heider et al. ............. 280/6.153 |
| 5,347,457 A | | 9/1994 | Tanaka et al. |
| 5,707,045 A | * | 1/1998 | Easter ....................... 267/64.21 |
| 5,725,066 A | * | 3/1998 | Beard et al. .............. 180/89.12 |

(Continued)

FOREIGN PATENT DOCUMENTS

FR 2 790 312 9/2000

(Continued)

OTHER PUBLICATIONS

European Search Report, dated Mar. 7, 2003.

*Primary Examiner*—Paul N. Dickson
*Assistant Examiner*—Joselynn Y. Sliteris
(74) *Attorney, Agent, or Firm*—Fulwider Patton LLP

(57) ABSTRACT

A system is provided for use on large vehicles of the type wherein the vehicle frame (12) is supported on vehicle axle assemblies (14, 20, 22) through air bags (26, 30, 32), and each air bag has a lower end coupled to the lower end of an arm such as a swing arm (112) whose upper end is pivotally mounted on the frame. The height of the air bag is sensed by a pair of tilt sensors (50, 52), one on a tilt arm such as the swing arm (112), that has one end pivotally connected to the vehicle frame and an opposite end at least pivotally connected to the vehicle axle assembly. The other sensor senses tilt of the vehicle frame about an axis parallel to the axes of pivoting of the tilt arm. Each tilt sensor senses tilt of its location with respect to gravity, and the difference in tilt indicates air bag height.

7 Claims, 4 Drawing Sheets

U.S. PATENT DOCUMENTS

| | | | |
|---|---|---|---|
| 5,787,932 A * | 8/1998 | Pierce | 137/627.5 |
| 5,825,284 A * | 10/1998 | Dunwoody et al. | 340/440 |
| 5,859,692 A * | 1/1999 | Ross et al. | 356/4.01 |
| 5,921,532 A * | 7/1999 | Pierce et al. | 267/64.19 |
| 6,332,623 B1 * | 12/2001 | Behmenburg et al. | 280/124.16 |
| 6,446,980 B1 * | 9/2002 | Kutscher et al. | 280/5.508 |
| 6,923,453 B2 * | 8/2005 | Pivac | 280/6.154 |
| 6,991,239 B2 * | 1/2006 | Schutt et al. | 280/5.514 |
| 2003/0205869 A1 * | 11/2003 | Schutt | 280/5.514 |
| 2006/0027991 A1 * | 2/2006 | Schutt et al. | 280/124.128 |

FOREIGN PATENT DOCUMENTS

| | | |
|---|---|---|
| WO | WO 9825779 | 6/1998 |
| WO | WO 0189863 | 11/2001 |

* cited by examiner

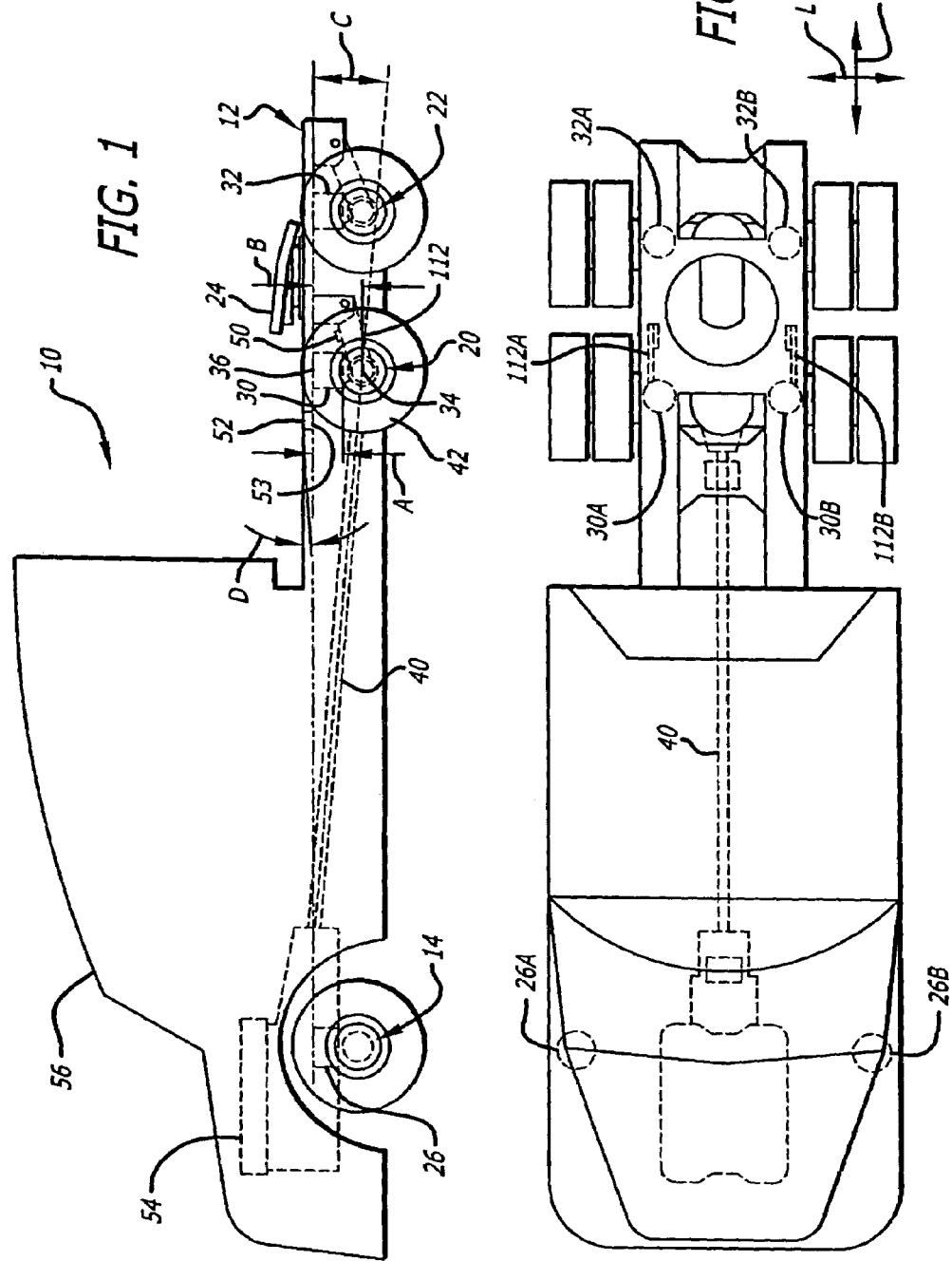

ELECTRONIC CONTROL OF VEHICLE AIR SUSPENSION

CROSS-REFERENCE TO RELATED APPLICATION

This is a continuation of Ser. No. 10/355,900, filed Jan. 31, 2003, now U.S. Pat. No. 6,918,600, which is based upon provisional patent application Ser. No. 60/375,464, filed Apr. 23, 2002.

BACKGROUND OF THE INVENTION

Large vehicles commonly have a frame rear portion supported on a rear axle assembly at least partially through an air bag. Smaller vehicles are also starting to use this type of suspension. In many cases, swing arms are used to control the horizontal position of the frame relative to the rear axle assembly. The swing arm has an upper end pivotally connected to the frame and a lower end pivotally connected to the rear axle. An air bag extends primarily vertically between the axle assembly and the vehicle frame to serve as a spring that supports much of the weight of the frame on the axle. A vehicle manufacturer commonly sets a predetermined height for each air bag. A leveling valve is used to flow air into and out of each air bag to create an air bag pressure that results in the air bags remaining at the predetermined height. In one example, an air bag may have an optimum height of fifteen inches, and the pressure in each air bag may vary between 40 psi when the vehicle is empty, to 70 psi when the vehicle is fully loaded (e.g. to 75% of the maximum).

The height of an air bag previously has been sensed by a mechanical linkage between an axle assembly and an adjacent location on the vehicle frame. In the United States, it has been common to rely upon movement of a rod or other mechanical component connected to the axle assembly, and extending to a valve assembly mounted on the frame. Such movement directly opens and closes selected valves that respectively admit air from a high pressure source (e.g. 140 psi) to the air bags, or that dump air from the air bags into the atmosphere. In European vehicles, it is common to provide an electrical signal indicating the height of an air bag. This is accomplished by a mechanical linkage comprising a rod mounted on a vehicle axle assembly that operates a potentiometer mounted on the vehicle frame. The electrical signal is used to control valves that flow high pressure air into the air bags or that drain air from the air bags to the atmosphere, or environment.

Some disadvantages of a mechanical linkage are that it is usually thin and easily damaged, and has bushings that wear out. Also, a repairman may improperly adjust it, casing rapid wear of the vehicle transmission and poor vehicle suspension. Further, the air control valve may react instantly to road bumps and undulations, or short term vehicle acceleration and deceleration. Such reactions can cause excessive consumption of pressured air, and possibly compromise other systems such as the braking system that rely on pressured air. Apparatus for maintaining proper air bag pressure, without using a mechanical linkage between the lower end of the swing arm and the vehicle frame, would be of value.

SUMMARY OF THE INVENTION

In accordance with one embodiment of the present invention, an apparatus for sensing air bag height is provided for use in a vehicle, which generates an electrical signal for use by an electrically-controlled air valve. The apparatus includes a pair of electrical tilt sensors, one tilt sensor being mounted on the vehicle frame and the other being coupled to a tilt arm extending between the frame and the axle assembly and pivotally coupled to each of them. In most cases where a swing arm extends from the frame to the axle assembly, the swing arm serves as the tilt arm on which one tilt sensor is mounted. Any change in the tilt angle of the two sensors, indicates a change in tilt angle of the swing arm with respect to the vehicle frame, which indicates a change in air bag height. The electrical outputs of the tilt sensors are delivered to an electronic control that operates valves that flow air into and out of the air bag.

One of the tilt sensors can include two parts to sense tilt about two perpendicular horizontal axes. As a result, the two parts of the same tilt sensor can be used to sense sideward tilt of a vehicle, as when a heavy load is placed on one side. The electronic control can use such information to maintain different pressures in air bags lying at different sides of the vehicle, to minimize sideward tilt of the vehicle.

The novel features of the invention are set forth with particularity in the appended claims. The invention will be best understood from the following description when read in conjunction with the accompanying drawings.

BRIEF DESCRIPTION OF THE DRAWINGS

FIG. 1 is a representation of a side view of a heavy vehicle, showing air bag height sensing apparatus of the present invention.

FIG. 2 is a plan view of the vehicle of FIG. 1.

DESCRIPTION OF THE PREFERRED EMBODIMENTS

Figure 3:
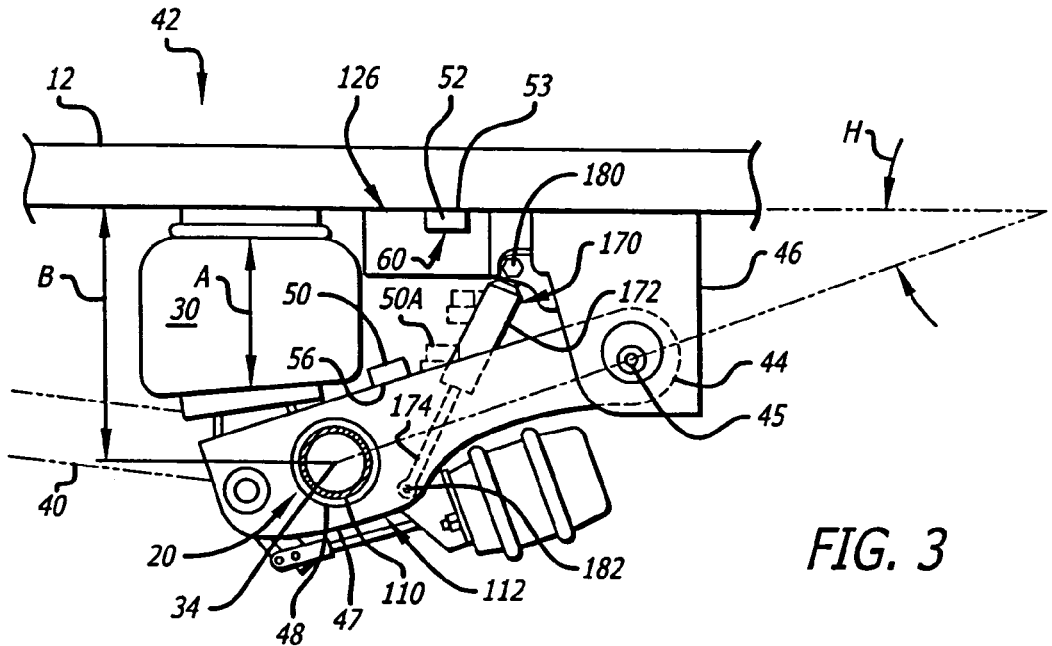
FIG. 3 is a side elevation view of a portion of the apparatus of FIG. 1, showing the swing arm and associated parts of the vehicle.

FIG. 1 illustrates portions of a large vehicle or truck 10, which includes a frame 12, a front axle assembly 14, and two rear axle assemblies 20, 22. Axle assembly 20 is a drive axle assembly whose axle is driven by a drive shaft 40 that is, in turn, driven by an engine 54 at the front of the vehicle. The drive axle assembly 20 includes bearings that rotatably support the drive axle, and can include a differential gear train and housing, etc. The large weight of a trailer is applied to the rear portion 24 of the truck, and the two rear axle assemblies support that weight. Air bags 26, 30, 32 support locations on the frame 12 on the axle assemblies. As mentioned above, the height of each air bag, such as A, is determined by the manufacturer, and when this height is maintained the axis 34 of the drive axle assembly 20 is maintained at a predetermined ride height B below the frame. A large deviation from the optimum air bag height for air bags 30, 32, for a considerable period of time, results in potentially destructive forces such as rapid wear, on the drive train members that transmit torque from the drive shaft 40 to the drive axle 20. A large deviation of the air bags from the optimum height, also can result in poor suspension of the frame, which can lead to "bouncing" on a road and other undesirable characteristics.

FIG. 3 shows details of the suspension 42 in the vicinity of the drive axle assembly 20 which carries bearings that rotatably support the axle about a lateral axis 34. A swing arm 112 has one end portion 44 pivotally connected abut axis 45 to a bracket 46 of the vehicle frame. The swing arm has another end portion 47 connected to the axle assembly 20. The swing arm can be fixed with respect to bearings 48 of the axle assembly, and the swing arm is pivotally (and rotatably) coupled to the axle 110 of the axle assembly. The air bag 30 supports the vehicle frame 12 above the axle at the ride height B. When the ride height B is the proper height set by the manufacturer, the air bag has a height A and the drive shaft 40 extends at the designed angle for minimum wear at the gears that connect to the drive shaft 40. The swing arm 112 (and another swing arm at the opposite side of the frame) helps control the horizontal position of the axle assembly 20 with respect to the frame 12. It is noted that elements other than swing arms can be used to control the horizontal position of the axle assembly while permitting its limited vertical movement, such as beams in the form of leaf springs, etc.

In order to determine when the air bag is at the proper height A, applicant mounts a pair of electronic tilt sensors 50, 52, one of them 50 mounted on a location 56 on the swing arm 112, to sense the angle of tilt of the swing arm with respect to gravity. The other 52 is mounted on a location 53 on the vehicle frame. The difference in tilt angles equals the angle H between the vehicle frame and the angle of the swing arm, and the sine of angle H, in the illustration, is approximately proportional to the air bag height A and the ride height B. Although the tilt angle H may temporarily vary, as when the vehicle accelerates, the angle H generally should remain at a value that results in a ride height B equal to that specified by the manufacturer. In FIG. 3 the tilt angle is 20.5° and the preferred air bag height A is fifteen inches. When the tilt angle H increases, air bag pressure is reduced to return to the previous height, and vice versa, unless other considerations require a different bag height.

At times, the vehicle orientation changes, as when the vehicle goes up or down an incline. This change will affect both tilt sensors 50 and 52 equally. If, however, a load is placed on the truck, the height A of the air bag tends to decrease and the angle H also decreases, resulting in a change in the difference between the outputs of the two tilt sensors 50, 52. The control system will increase the air bag pressure to return the angle H and therefore the air bag height A and the ride height B, to the previous optimum levels. Thus, the air bag height A and the angle of the drive shaft 40 are found by taking the difference between two tilt sensors.

The outputs of the individual tilt sensors are used for another function. They indicate when the truck is stable and in a condition in which we can depend upon the difference in outputs of the two tilt sensors. There are some conditions, such as rapid acceleration, deceleration, traveling around turns, etc., where the control will suppress any corrections, because the conditions are temporary. This will be determined by running the individual tilt sensor outputs through a software algorithm that filters out short term (e.g. less than several seconds) changes. Accelerometers and appropriate electrical control circuits also can be used to sense or compensate for these short-term conditions.

It is possible to use only the tilt of the sensor on the swing arm to control bag height. For example, if the weight on the front axle increases while the vehicle is in motion, this indicates that the vehicle is traveling at a downward incline, although this can be considered to be a tilt sensor. Alternately, applicant can delay adjustment in bag pressure until the vehicle is horizontal and/or stopped. Applicant prefers to not use these procedures.

Figure 4:
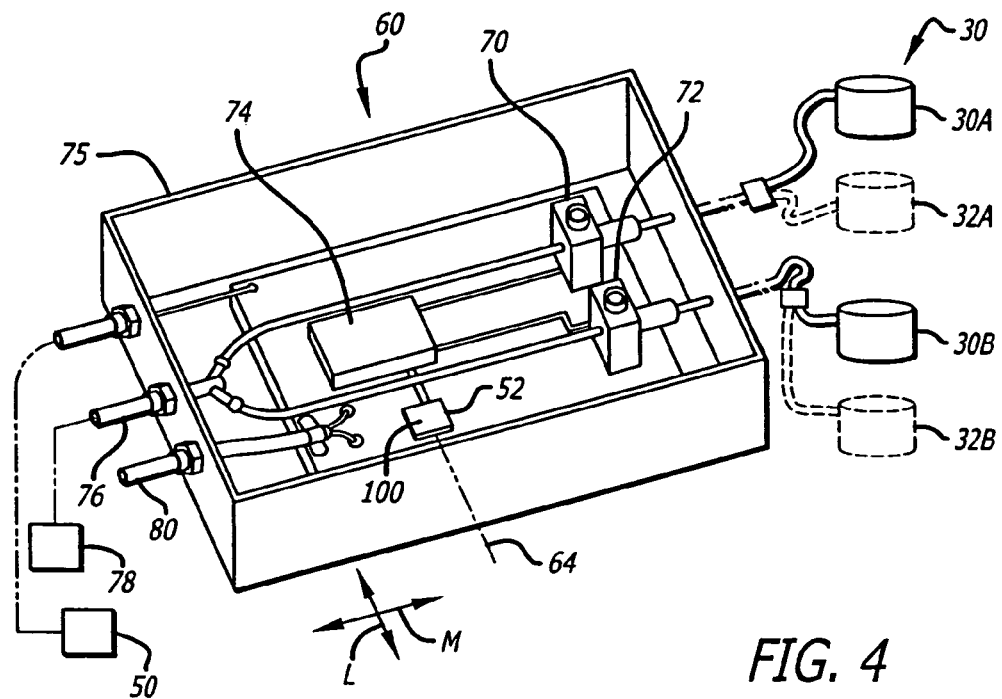
FIG. 4 is an isometric view of a control of the apparatus of FIG. 3.

FIG. 4 illustrates the construction of a control 60 that applicant provides to maintain the desired air bag height, and therefore the desired ride height and drive shaft angle. The control includes a circuit comprising a CPU (central processing unit) and memory 74 connected to the tilt sensor 52 that is mounted on the vehicle frame to sense tilt about a lateral axis 64 that extends in a lateral L direction. Among other things, the circuit generates a signal representing the difference in tilt angles. The CPU 74 and sensor 52 are preferably mounted in the same housing 75. The control is also connected to the tilt sensor 50 that is mounted on the swing arm and that senses tilt about another lateral axis. The control controls a pair of valve assemblies 70, 72. A hose 76 carries high pressure air (e.g. 140 psi) from a pressured air source 78 on the vehicle to the valve assemblies 70, 72. An electrical cable 80 carries electrical power to operate the valves and other parts of the system.

When the difference between the tilt angles sensed by the tilt sensors 50, 52 changes, the circuit 74 delivers signals that operate the valve 70 to either flow pressured air from the hose 76 to the air bags 30, 32 or to connect the air bags to the atmosphere so as to drain air from the air bags. It is generally desirable to not pass air into or out of the air bag when it is within a predetermined small distance above or below a predetermined height. Also, the CPU senses short duration changes in tilt angle differences (e.g. lasting less than several seconds) such as the vehicle passing over a bump in the road, and ignores them (does not change air bag pressure). This can be accomplish with a filter that blocks a frequency on the order of magnitude of 0.1 Hz and greater.

The vehicle will sometimes be tilted for an extended period of time because it is moving up or down along an inclined road or is parked on an inclined driveway, and will sometimes be tilted because it is accelerating or decelerating. As mentioned above, the unit 74 is programmed to avoid changing the air pressure as a result of temporary changes when the vehicle accelerates, decelerates, passes over a bump, or drops in a pot hole.

Figure 5:
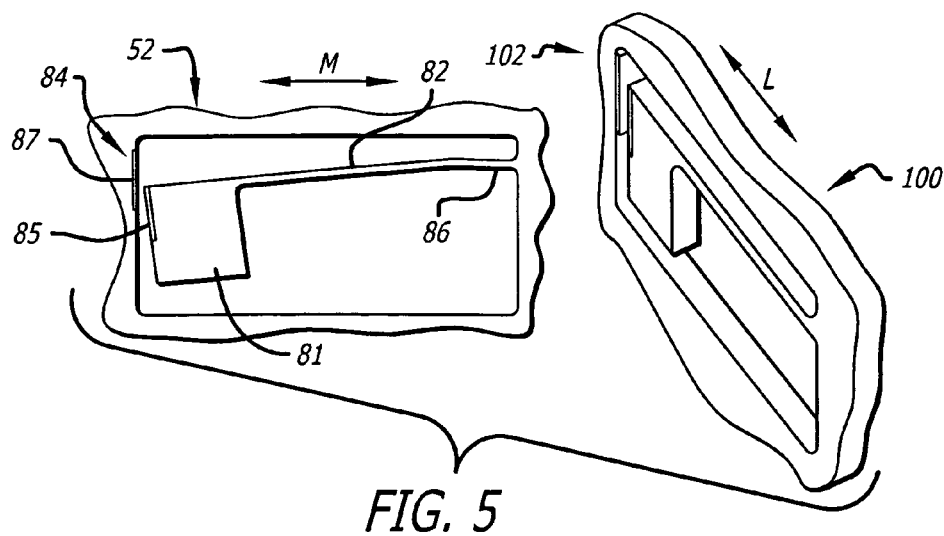
FIG. 5 is a side and isometric view of a tilt sensor arrangement of the present invention.

FIG. 5 shows a preferred tilt sensor 52 that applicant has used. The tilt sensor 52 is of a type commonly used as an accelerometer, which includes a weight 81 lying at the end of a cantilevered beam 82. A detector 84 detects bending of the beam, which results in vertical movement of the weight. The detector 84 can be formed by a pair of capacitor plates 85, 87. The capacitance between them changes as the weight moves up and down, so the detector can be said to generate a signal indicating tilt. The tilt sensors can be positioned at any initial orientation (but sense tilt about parallel axes), and the initial differences in their outputs is deemed to indicate the initial angle H. A variation in the detector 52 of FIG. 5 is a detector that includes a resistor or other elongation/contraction sensor fixed to the top or bottom of the beam 82 to detect changes in beam bending.

In the detector of FIG. 5, when the inner end 86 of the beam is horizontal, there is a predetermined beam bending and corresponding capacitance of the detector 84. Any change in capacitance indicates tilt of the inner end 86. It is noted that accelerators of the type illustrated at 52 in FIG. 5, are very small and are commonly formed by etched silicon, that they have been used on joy stick controls to detect tilt, and that they can detect any change in tilt of about 0.2° if properly constructed. Applicant actually prefers that the tilt sensors be dual axis devices that each includes a second tilt sensor to sense tilt in lateral L and transverse longitudinal directions M independently. Applicant can mount each tilt sensor for maximum sensitivity. For example, applicant can mount the sensor 50 of FIG. 3 in the position 50A to orient the beam 86 of FIG. 5 close to a horizontal orientation. As shown in FIG. 2, applicant provides pairs of air bags 26A, 26B, 30A, 30B and 32A, 32B to support opposite sides of the vehicle. Each pair is represented by the air bags indicated at 26, 30 and 32 in FIG. 1. In prior systems, it was usually assumed that the pressure of air bags such as 30A and 30B at opposite sides of the vehicle should be at the same air pressure. If the load on the vehicle is well distributed so that opposite sides have the same load, this will be sufficient. However, in many cases the load is not equally distributed at opposite sides of the vehicle. In that case, if the air pressure in each pair of air bags such as 30A, 30B is equal, then the rear of the vehicle frame will tilt, resulting in considerable tilt at the top of a tall trailer. Such tilt is undesirable, as it tends to cause shifting of load and bouncing of the vehicle.

To avoid tilt of the vehicle such as a tall trailer, applicant provides another tilt sensor shown at 100 in FIG. 5, which extends in a lateral direction L to detect sideward tilt of the vehicle, which is tilt about the longitudinal direction M (or about an axis extending in the longitudinal direction). The tilt sensor construction is used except that the tilt sensor 100 is oriented 90° from the orientation of the tilt sensor 52, but with its detector 102 still positioned to detect tilt of the tilt sensor 100 from the horizontal. With such orientation of the tilt sensor 100, application can maintain a different pressure in one air bag such as 30A than in another air bag 30B at the opposite side of the vehicle (but equally spaced from the front and rear of a vehicle). Such different pressures at opposite sides, are usually maintained to keep the air bags at the opposite sides each at approximately the prescribed height. In FIG. 4, this can be accomplished by using the output of the tilt sensor 100 to enable the control 60 to change the air pressure controlled by the valves 70, 72 in the two opposite air bags 30A, 30B (and 32A, 32B).

Figure 8:
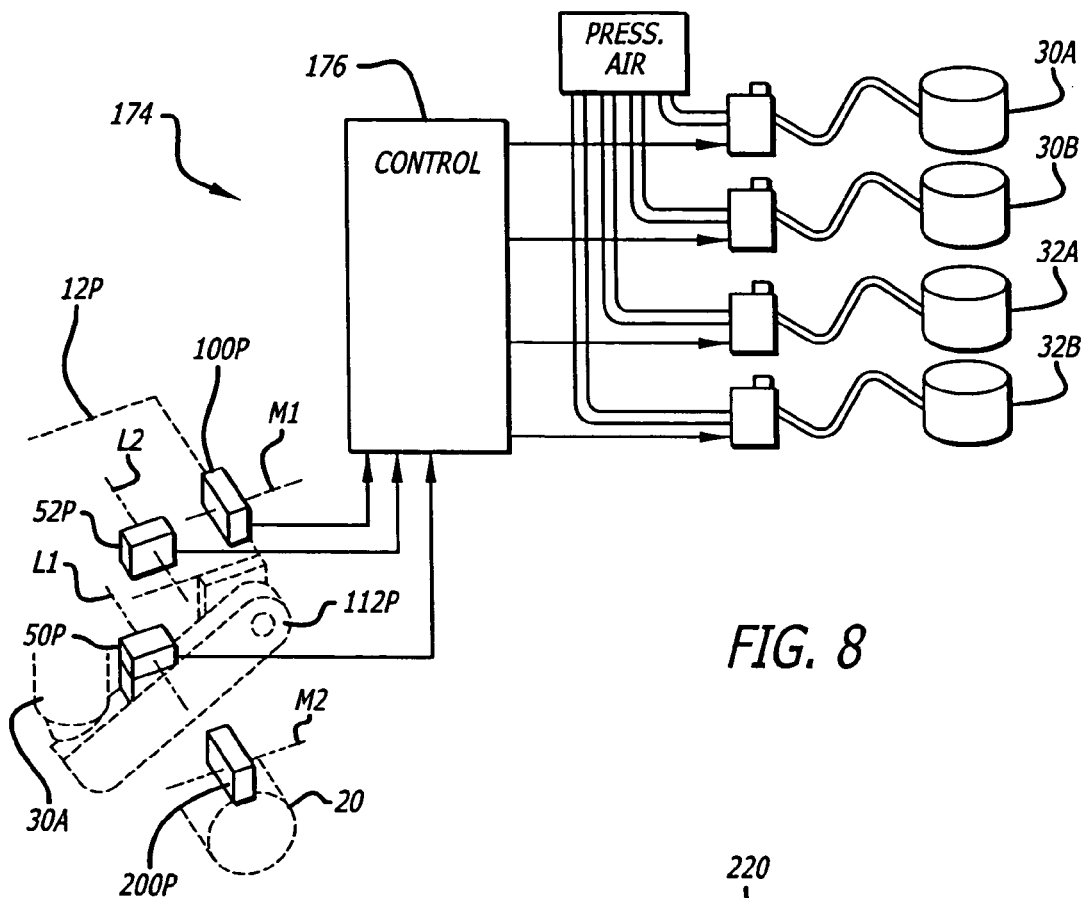
FIG. 8 is a partial isometric and schematic diagram of another vehicle suspension and control system.

FIG. 8 shows a system 174 where a control 176 senses the outputs of three tilt sensors 50P, 52P and 100P, to control the air pressure in each of four of the air bags 30A, 30B, 32A, 32B. Two of the tilt sensors 50P, 52P correspond to tilt sensors 50 and 52 of FIG. 3 and are mounted, one on a tilt arm 112P and the other on the vehicle frame 12P. The third tilt sensor 100P corresponds to the tilt sensor 100 of FIG. 5, and is preferably mounted on the frame 12P. The tilt sensor 100P senses tilt about a longitudinal axis Ml that is horizontal and that is perpendicular to the lateral axes L1, L2 of the other tilt sensors.

The control 176 adjusts air pressure in air bag 30A that lies adjacent to swing arm 112P to maintain a predetermined air bag height, which is achieved by a predetermined difference in angles sensed by sensors 50P and 52P. The control adjusts air pressure (FIG. 5) in air bag 30B so when air bag 30A is at the proper height, there is zero change of tilt from an initial position, of the tilt sensor 100P (FIG. 8) about the longitudinal axis. An additional tilt sensor 200P is used, that is mounted on the corresponding axle assembly 20 to measure any tilt of the vehicle due to sideward tilt of the road. Only the difference between the tilt angles senses by the two sideward tilt sensors 100P, 200P, or net sideward tilt, is used to control air pressure in air bag 30B. The pressure in air bag 30B is adjusted to reduce the net sideward vehicle tilt to substantially zero. The height of the two air bags 30A, 30B then will be equal (or will each have a height equal to the preset height for that bag).

In the above example, four tilt sensors are used, with one tilt sensor 50P mounted on one swing arm, one tilt sensor 200P mounted on the axle assembly, and two tilt sensors 52P, 100P mounted on the frame. Instead, applicant can mount one tilt sensor on each of two swing arms.

Figure 9:
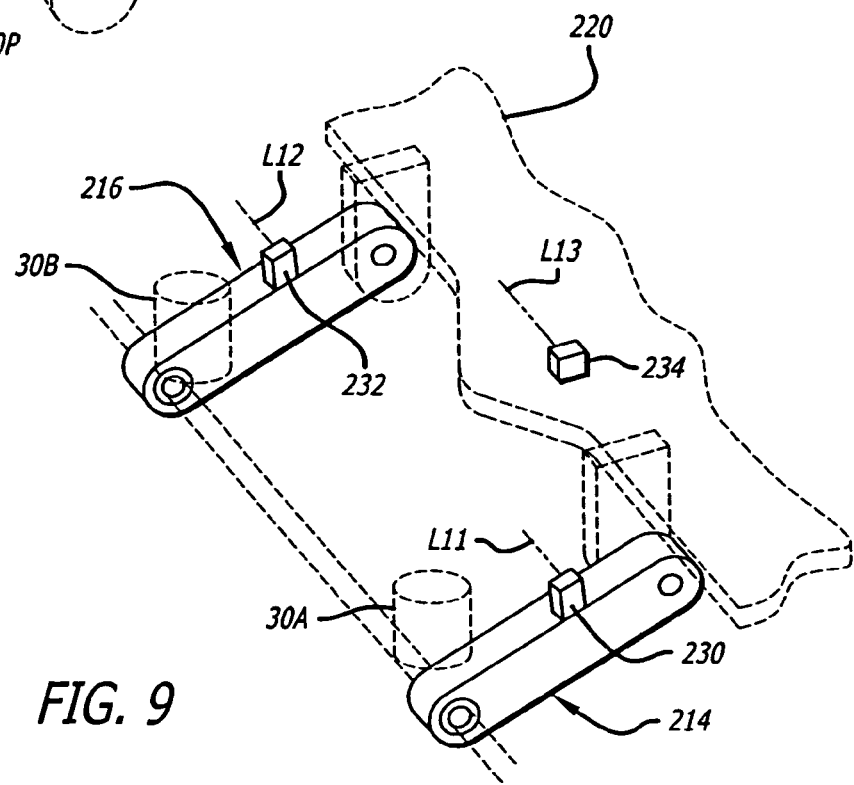
FIG. 9 is a partial isometric view of anther system.

In FIG. 9, swing arms 214, 216 lie at locations on opposite sides of the vehicle frame 220 that are supported by the two air bags 30A, 30B. Two tilt sensors 230, 232 are mounted, each on one of the swing arms 214, 216. Each of these sense tilt about a lateral axis L11 or L12. An additional tilt sensor 234, which senses tilt about lateral axis L13, is mounted on the frame 220. A control such as 176 in FIG. 8, generates a signal equal to the difference between vehicle tilt about a lateral axis L13 and the tilt of each swing arm. The control adjusts the air pressure in each air bag 30A, 30B so the difference in tilt angles indicates that the air bag is at the predetermined height.

In the above examples, applicant assumes that the vehicle frame is stiff, so tilt at both sides is equal. If not, a separate tilt sensor can be mounted on each side of the frame.

Figure 6:
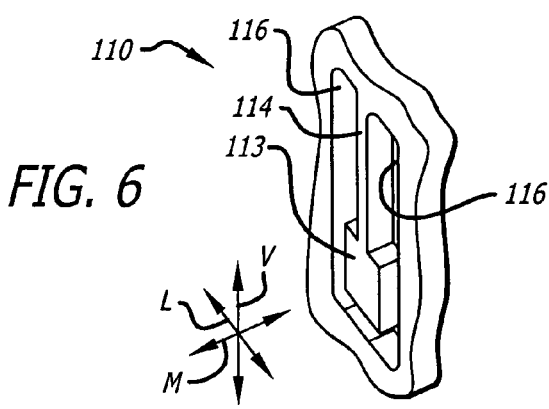
FIG. 6 as an isometric view of another sensor.

Applicant can also use sensors such as shown at 110 in FIG. 6 and at 52 and 100, to detect vibration of the vehicle. Such vibration is often caused by improper inflation of air bags, especially when the vehicle is empty. The presence of such vibrations detected by the sensors, when used as accelerometers, can be used to slightly change air bag pressure, and to maintain such change if the vibrations decrease. The particular sensor 110 has a weight 113 lying at the bottom of a beam 114. Laterally spaced walls 116 limit deflection when the vehicle is traveling along a curved path.

Figure 7:
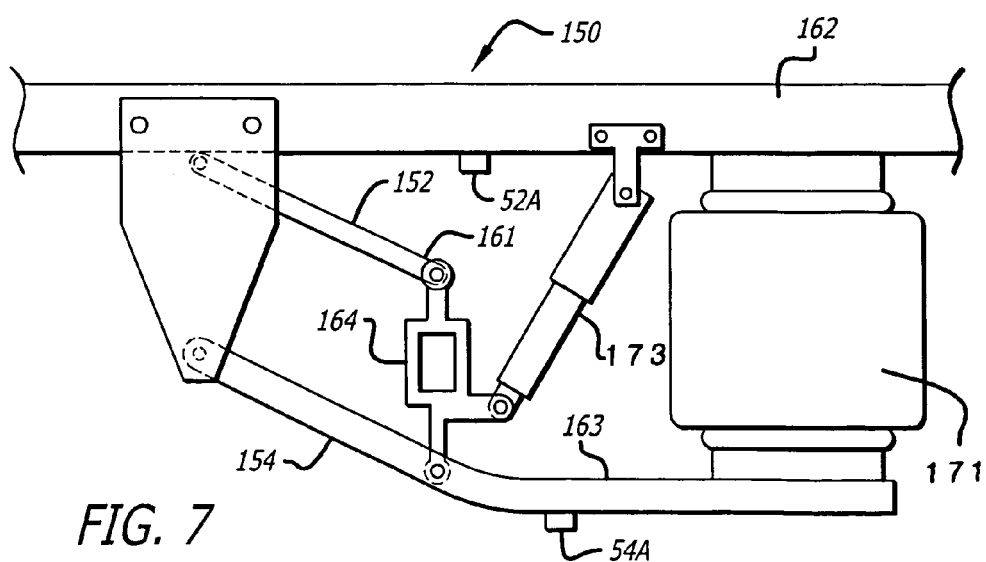
FIG. 7 as a simplified side view of a portion of another vehicle suspension system, and of the present invention.

FIG. 7 illustrates a portion 150 of another vehicle suspension system, which includes upper and lower swing arms 152, 154 with upper ends pivotally connected to the vehicle frame 162. The swing arms have lower ends 161, 163 that are pivotally connected to an axle frame 164 on which a vehicle axle is rotatably supported through bearings. The lower swing arm 154 lower end has a rearward extension that supports an air bag 171. A shock absorber 173 also connects the vehicle frame 162 to the axle frame. In this type of suspension the axle frame 164 undergoes only a slight rocking motion (typically within 3°) when the lower swing arm 154 pivots over a wide range (e.g. as much as 20°). One tilt sensor 54A is mounted on a tilt arm formed by the lower swing arm 154 and the other tilt sensor 52A is mounted on the vehicle frame 162. A control similar to control 60 uses outputs from tilt sensors 52A, 54A to control air bag height.

As mentioned above, a major purpose of the swing arms 112 (FIG. 3) is to control the horizontal position of the axle assemblies such as 20 with respect to the vehicle frame 12. However, other elements can be used to accomplish this, so swing arms are not required. Whether or not a swing arm is used in the suspension, a tilt arm can be used which has one end pivotally coupled to the frame and another end pivotally coupled to the axle assembly, and with one tilt sensor mounted on the frame and the other mounted on the tilt arm. In FIG. 3, the swing arm serves as such a tilt arm.

FIG. 3 shows a shock absorber 170 that includes a cylinder 172 and a piston 174 that can slide (telescope) within the cylinder. The top of the cylinder is pivotally mounted about a horizontal axis at 180 on the frame and the bottom of the piston is pivotally coupled about another horizontal axis at 182 on the axle assembly (at the lower end of the swing arm 112). It is possible to mount a tilt sensor on the piston or cylinder of the shock absorber instead of on the swing arm 112, even though the length of the shock absorber changes slightly, so the shock absorber serves as a swing arm However, applicant prefers to use the swing arm as the tilt arm, when the swing arm is part of the suspension. The pivot axes at 180, 182 at opposite ends of the tilt arm, are preferably horizontal, but if they are angled more than a few degrees from parallel to the axle axes 34 then the second tilt sensor 52 should be oriented to sense tilt about a parallel axis.

While applicant has used the term "pivotal connection" or the like to describe movable joints that allow pivoting, it should be noted that such moveable joints often allow other movement, or degrees of freedom, at the joint, and such terms as "pivotal connection" should be interpreted to include connections that may allow one or more movements in addition to pivoting about an axis.

Thus, the invention provides a vehicle air suspension system with an electronic sensor arrangement for sensing change in air bag height, by sensing tilt of a tilt arm pivotally coupled to the frame and to an axle assembly. Where a swing arm is used to help control the horizontal position of the axle assembly with respect to the frame, application prefers to mount the tilt sensor on the swing arm. Generally, another tilt sensor is mounted on the vehicle frame, with the difference between the two tilt angles indicating tilt of the swing arm relative to the frame. This avoids the need for mechanical mechanisms whose accuracy can be impaired and which may be more subject to damage and wear. The two tilt sensors can account for tilt of the entire vehicle as when the vehicle lies on an inclined road or driveway. Applicant prefers to use tilt sensors in the form of accelerometers of the type where a weight lies at the end of a cantilevered beam, to sense tilt in the air suspension adjustment system. However, any sensor can be used that detects tilt of an arm with respect to gravity or to the frame or axle, whose tilt indicates change in airbag height, where the sensor generates an electrical output without mechanical links between the arm and sensor. A tilt sensor can be used to detect tilt on one side of the vehicle relative to an opposite side. Such sideward tilt, plus tilt sensors on an arm and the frame, can be used to maintain proper air bag height at both opposite sides of the vehicle. It is also possible to mount tilt sensors on swing arms (or other tilt arms) at opposite sides of the vehicle, adjacent to opposite air bags. Then applicant uses the difference between each sensor on a swing arm and a sensor on the frame, to control pressure in air bags adjacent to the two swing arms.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for controlling a vehicle suspension system, the vehicle suspension system including a vehicle frame, a plurality of axle assemblies that have axles that support said frame above the ground, including a first axle assembly with a first axle, a first fluid operated lifting actuator that extends from substantially said first axle assembly to said frame to support at least part of the frame weight on said first axle assembly, apparatus for sensing the height of the lifting actuator including a tilt arm having first and second end portions pivotally coupled about a predetermined axis of the frame respectively to said frame and to said first axle, and a first tilt sensor, at least one component of which is mounted on a first location on said tilt arm, said first tilt sensor generating a signal indicating tilt, and a control that includes a filter means connected to said first tilt sensor to receive said signal, said control including at least one means to control said first lifting actuator, the steps of the method comprising:

sensing the tilt angle of said first location on said tilt arm and generating a signal indicating the tilt angle of said first location about a predetermined axis of said frame, thereby indicating a tilt of said tilt arm and indicating said first lifting actuator height; and controlling fluid flow into or out of said first lifting actuator to avoid flowing fluid into or out of said first lifting actuator when the tilt of said tilt arm lasts less than approximately a predetermined time period, and avoiding flowing fluid into or out of said first lifting actuator when said first lifting actuator height is within a predetermined distance above or below a predetermined height.

2. The method of claim 1, wherein said vehicle suspension system further includes a second tilt sensor mounted on a second location that is fixed relative to said vehicle frame to tilt therewith for sensing tilt of said second location about said predetermined axis on said frame, and for sensing tilt about a second tilt sensor axis transverse to said predetermined axis, and further comprising:

generating a signal indicating tilt angles of said second location about said predetermined axis and about said second tilt sensor axis transverse to said predetermined axis; and generating a signal representing a difference in tilt angles of said first and second tilt sensors about said predetermined axis, to thereby indicate lifting actuator height even when the vehicle is on an inclined surface.

3. The method described in claim 2, further comprising: controlling the height of said first lifting actuator; and controlling the flow of fluid into and out of said first lifting actuator to flow fluid into said first lifting actuator when said difference in tilt angles decreases below a first predetermined angle and to flow fluid out of the first lifting actuator when said difference in tilt angles increases above a second predetermined angle.

4. The method of claim 2, wherein said vehicle frame has left and right laterally opposite vehicle side portions, said first lifting actuator and first tilt arm are located at said vehicle left side portion, and a second lifting actuator is located on said vehicle right side portion, and further including a third tilt sensor mounted on said vehicle frame and orientated to sense sideward tilt of said vehicle frame about a longitudinal axis, and said second tilt sensor axis transverse to said predetermined axis is the longitudinal axis for sensing sideward tilt, said control being coupled to said first, second and third tilt sensors, and comprising:

controlling the flow of fluid into and out of said first and second lifting actuators partially in accordance with sideward tilt of said vehicle.

5. The method of claim 2, wherein said vehicle frame has a vehicle left side portion and a vehicle right side portion, said vehicle left side portion and said vehicle right side portion being laterally opposite of one another, and said first lifting actuator and first tilt arm are located at said vehicle left side portion, and including a second lifting actuator and second tilt arm located on said vehicle right side portion, and further including a third tilt sensor mounted on said second tilt arm, said control being coupled to said first, second and third tilt sensors, and comprising:

controlling the flow of fluid into and out of said first lifting actuator and said second lifting actuator, respectively, according to the difference in angle between said first and second tilt sensors about said predetermined axis, and the difference in angle between said second and third tilt sensors about said axis transverse to said predetermined axis.

6. The method of claim 1, wherein said time period is on the order of magnitude of ten seconds.

7. The method of claim 1, wherein said first lifting actuator is an air bag.

* * * * *

UNITED STATES PATENT AND TRADEMARK OFFICE
CERTIFICATE OF CORRECTION

| | | |
|---|---|---|
| PATENT NO. | : 7,192,032 B2 | Page 1 of 1 |
| APPLICATION NO. | : 11/123728 | |
| DATED | : March 20, 2007 | |
| INVENTOR(S) | : Dodd et al. | |

It is certified that error appears in the above-identified patent and that said Letters Patent is hereby corrected as shown below:

The third and last inventor's name, Sriram Jayasimha, needs to be added to the face of the patent.

On title page Item (75) please add:
Sriram Jayashimha, Hyderabad, India India

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,192,032 B2 | Page 1 of 1 |
| APPLICATION NO. | : 11/123728 | |
| DATED | : March 20, 2007 | |
| INVENTOR(S) | : Dodd et al. | |

It is certified that error appears in the above-identified patent and that said Letters Patent is hereby corrected as shown below:

The third and last inventor's name, Sriram Jayasimha, needs to be added to the face of the patent.

On title page Item (75) please add:
Sriram Jayasimha, Somajiguda, India

This certificate supersedes Certificate of Correction issued April 24, 2007.

Signed and Sealed this

Tenth Day of July, 2007

JON W. DUDAS
*Director of the United States Patent and Trademark Office*